Oct. 18, 1932.  E. M. CROSLAND  1,883,592
PROCESS FOR THE MANUFACTURE OF BISCUITS OR
THE LIKE ARTICLES AND MACHINE THEREFOR
Filed April 8, 1932
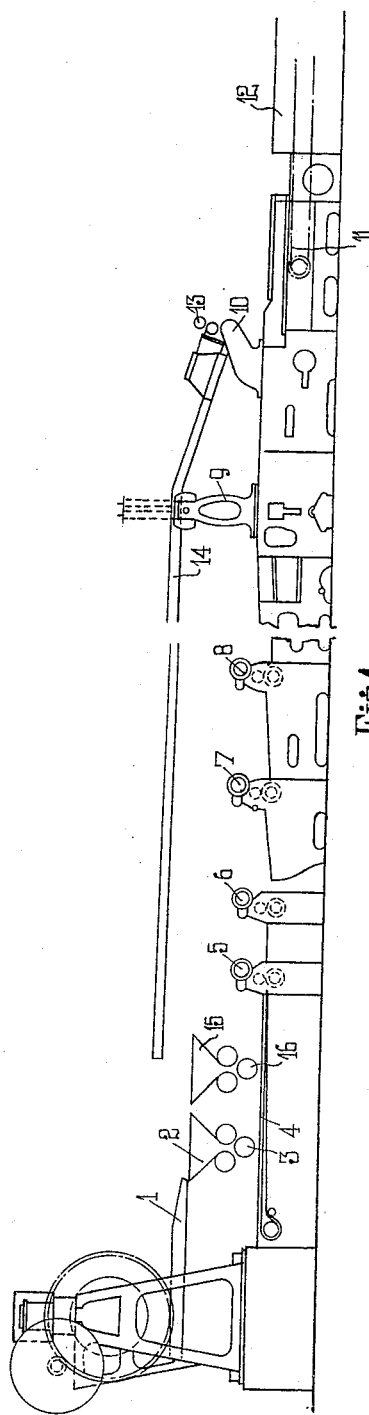
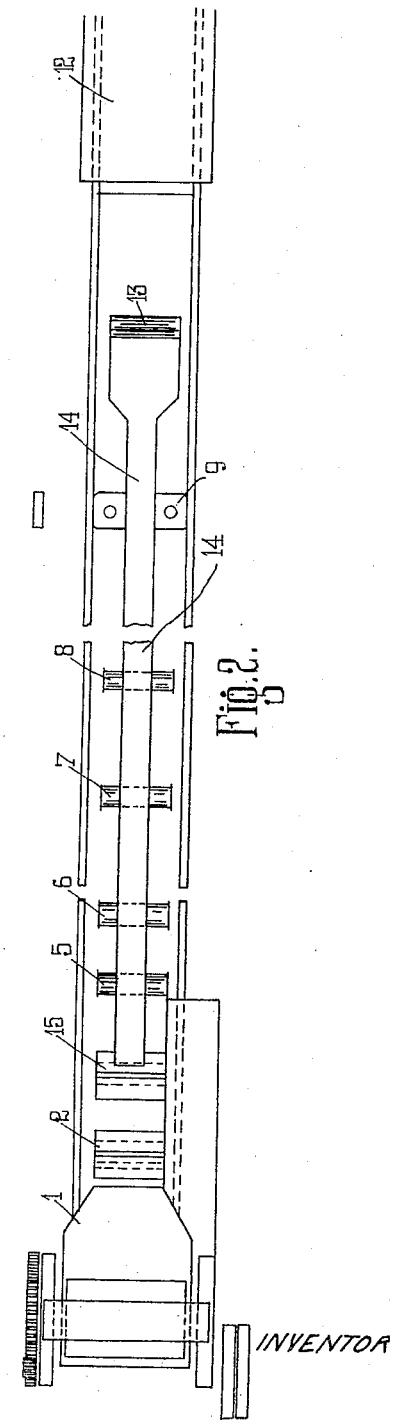
INVENTOR
Edward M. Crosland,
BY
ATTORNEY Patented Oct. 18, 1932

1,883,592

UNITED STATES PATENT OFFICE

EDWARD MILNER CROSLAND, OF NEWTON-LE-WILLOWS, ENGLAND

PROCESS FOR THE MANUFACTURE OF BISCUITS OR THE LIKE ARTICLES AND MACHINE THEREFOR

Application filed April 8, 1932, Serial No. 604,098, and in Great Britain January 25, 1932.

The present invention relates to an improved process for the manufacture of biscuits and to a machine for carrying out this process.

In the manufacture of biscuits it is usual to punch the biscuits by means of a cutting machine from a preformed sheet of dough, the scrap dough being usually conveyed back in the form of a reticulate sheet to the same feeding mechanism or sheeter as operates upon the fresh dough. Now a disadvantage of this method of manufacture is that certain parts of the dough have obviously received a greater degree of treatment by the rolls of the sheeter gauging rollers etc. than other parts, and consequently certain biscuits or the like articles may, due to lumps in let us say, scrap being fed irregularly with lumps of fresh dough, be found to present a different appearance and character after baking than others.

With a view to obtaining a uniform appearance in character for a biscuit or the like article, according to the present invention scrap dough is conveyed back to a second sheeter, usually working in tandem with the first sheeter, so that a double sheet is passed to the gauging rollers and the sheet operated upon by the cutters will have layers composed of dough of similar analytical content, but of different character inasmuch as one layer will have been worked to a greater degree than the other, and it has long been appreciated that the character of the dough is very susceptible indeed to the manner and degree of its working.

The invention is more particularly described with reference to the accompanying drawing in which :—

Figure 1 is a side elevation of part of a biscuit machine.

Figure 2 is a corresponding plan view.

Dough is fed from a chute 1 to the hopper 2 of a sheeter 3 being delivered as a sheet of dough upon a conveyor 4, from whence it is fed past gauging rollers 5, 6, 7, 8, to a cutting machine 9 of any desired form. The biscuits then pass on to be delivered by a delivery mechanism 10 to bands on a conveyor 11 by which they are conveyed in single or multiple flight through a baking oven 12. The scrap dough in the form of a reticulate sheet is lifted up by mechanism 10 and passed back in the usual manner by means of rollers 13 to a return conveyor 14, which in contra-distinction to known arrangements does not feed back into the hooper 2 of the sheeter 3, but into the hopper 15 of the separate sheeter 16, which therefore, delivers a sheet of dough, and a second layer upon the sheet of dough delivered by the sheeter 3.

It will be seen therefore, that the biscuit formed by this method will be uniform in appearance and texture, although the upper layer in this case will be formed of dough which is worked to a greater degree due to the fact that it has passed through both sheeters 3 and 16, than the lower layer. This however, has a further advantage in that the upper surface of the biscuit will tend to be smoother and present a better appearance on baking.

I declare that what I claim is:—

1. A method of manufacturing articles from plastic material consisting in forming a sheet cutting the separate articles from said sheet conveying away the reticulate sheet of scrap plastic material forming a second sheet from said scrap material, and applying said second sheet to the first sheet as an additional layer prior to its treatment on the cutting machine.

2. A method of manufacturing biscuits consisting in forming a sheet of dough, separating individual biscuits therefrom, conveying away the reticulate sheet of scrap dough, forming a second sheet of dough from said scrap and applying said second sheet of dough so formed to the first sheet as an additional layer prior to its treatment on the forming machine.

3. A machine for manufacturing biscuits comprising a pair of dough sheeters operating in tandem, common gauge rolls for said sheets of dough, and means to feed the sheets one upon the other from said sheeters to said gauging rolls, and a cutting machine operating upon the gauged composite sheet, and means to convey the reticulate scrap from the cutting machine to one of the sheeters, and means to feed the other sheeter with supplies of fresh dough.

In witness whereof, I have hereunto signed my name this 15th day of March 1932.

EDWARD MILNER CROSLAND.